(12) United States Patent
Fan Jiang et al.

(10) Patent No.: US 8,026,541 B2
(45) Date of Patent: Sep. 27, 2011

(54) LIQUID CRYSTAL DISPLAY PANEL HAVING REFLECTIVE AREA PROTRUSIONS

(75) Inventors: Shih-Chyuan Fan Jiang, Hsinchu (TW); Ching-Huan Lin, Hsinchu (TW); Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 628 days.

(21) Appl. No.: 11/780,492

(22) Filed: Jul. 20, 2007

(65) Prior Publication Data

US 2008/0230788 A1 Sep. 25, 2008

(30) Foreign Application Priority Data

Mar. 20, 2007 (TW) ................................ 96109467 A

(51) Int. Cl.
*H01L 31/062* (2006.01)
(52) U.S. Cl. ................... 257/294; 257/E31.121; 438/69
(58) Field of Classification Search .................. 257/294, 257/E31.121; 438/69
See application file for complete search history.

(56) References Cited

U.S. PATENT DOCUMENTS

| 6,067,144 | A | 5/2000 | Murouchi |
| 6,567,139 | B2 | 5/2003 | Huang |
| 2002/0075443 | A1* | 6/2002 | Shimizu et al. ............... 349/155 |
| 2005/0200784 | A1* | 9/2005 | Kume et al. .................... 349/130 |
| 2005/0270449 | A1* | 12/2005 | Koma et al. ................... 349/114 |
| 2006/0158600 | A1* | 7/2006 | Mun et al. ...................... 349/156 |

FOREIGN PATENT DOCUMENTS

TW 387997 4/2000

\* cited by examiner

*Primary Examiner* — Thao Le
*Assistant Examiner* — Matthew Gordon
(74) *Attorney, Agent, or Firm* — Jianq Chyun IP Office

(57) ABSTRACT

A liquid crystal display (LCD) panel is provided. The LCD panel includes an active device array substrate, an opposite substrate, and a liquid crystal layer. The active device array substrate includes a plurality of pixel units, and each of the pixel units has a reflective area and a transmissive area. The opposite substrate is disposed above the active device array substrate and has a plurality of first alignment protrusions corresponding to the reflective area and a plurality of second alignment protrusions corresponding to the transmissive area. The first and the second alignment protrusions are positioned between the opposite substrate and the active device array substrate. Additionally, a height of the first alignment protrusions is greater than a height of the second alignment protrusions. The liquid crystal layer is disposed between the opposite substrate and the active device array substrate. The LCD panel has a high aperture ratio.

20 Claims, 8 Drawing Sheets

LIQUID CRYSTAL DISPLAY PANEL HAVING REFLECTIVE AREA PROTRUSIONS

CROSS-REFERENCE TO RELATED APPLICATION

This application claims the priority benefit of Taiwan application serial no. 96109467, filed Mar. 20, 2007. All disclosure of the Taiwan application is incorporated herein by reference.

BACKGROUND OF THE INVENTION

1. Field of the Invention

The present invention relates to a liquid crystal display (LCD) panel, and more particularly to an LCD panel with a high aperture ratio.

2. Description of Related Art

A display panel adopted in a liquid crystal display (LCD) is mainly composed of an active device array substrate, an opposite substrate, and a liquid crystal layer sandwiched between said two substrates. At this current stage, the LCD panels are developed towards full-colors, large sizes, high resolution and low costs. Among a variety of functions possessed by the LCD panels, the responding speed, the contrast, and wide viewing angle are all related to the liquid crystal layer.

In order to accurately maintain a cell gap between said two substrate of the LCD display, spacers are often inserted between the active device array substrate and the opposite substrate. In conventional LCD panels, ball spacers are usually used to maintain the cell gap. However, the ball spacers used in the conventional LCD panels are not distributed uniformly in most cases, and a light leakage often occurs at edges of the ball spacers. Therefore, photo spacers made of photoresist materials are developed and have gradually replaced the ball spacers. However, even though the photo spacers can be arranged neatly and uniformly, the light leakage may still occur at the edges of the photo spacers. In a process of fabricating the photo spacers, a shielding layer (ex. a black matrix) is usually formed in a position where the photo spacers are intended to be constructed, such that unfavorable image quality arisen from the light leakage may be avoided. Moreover, in order to secure the photo spacers, a stage corresponding to the photo spacers is fabricated on the active device array substrate. Thereby, an aperture ratio of the LCD panel is decreased.

In terms of a multi-domain vertical alignment (MVA) LCD panel, a plurality of alignment protrusions is frequently disposed on the opposite substrate to achieve the wide-viewing-angle effect. However, the light leakage may still occur at the edges of the alignment protrusions as it occurs at the edges of the aforesaid spacers, and a black matrix is required to prevent the image quality of the LCD panel from being adversely affected. Thus, how to maintain the aperture ratio in the MVA LCD panel having the spacers and the alignment protrusions is still an unsolved issue.

SUMMARY OF THE INVENTION

The present invention provides an LCD panel having alignment protrusions and spacers disposed therein to prevent an aperture ratio from decreasing significantly.

The present invention provides an LCD panel including an active device array substrate, an opposite substrate, and a liquid crystal layer. The active device array substrate includes a plurality of pixel units, and each of the pixel units has a reflective area and a transmissive area. The opposite substrate is disposed above the active device array substrate and has a plurality of first alignment protrusions corresponding to the reflective area and a plurality of second alignment protrusions corresponding to the transmissive area. The first and the second alignment protrusions are positioned between the opposite substrate and the active device array substrate. Additionally, a height of the first alignment protrusions is greater than a height of the second alignment protrusions. The liquid crystal layer is disposed between the opposite substrate and the active device array substrate.

According to an embodiment of the present invention, the active device array substrate includes a plurality of recesses. Each of the recesses corresponds to a portion of the first alignment protrusions. In addition, a gap exists between the active device array substrate and a portion of the first alignment protrusions corresponding to each of the recesses, and the other of the first alignment protrusions contact the active device array substrate.

According to an embodiment of the present invention, the opposite substrate further includes a black matrix corresponding to the first alignment protrusions and the second alignment protrusions.

According to an embodiment of the present invention, each of the pixel units includes an active device, a reflective pixel electrode and a transparent pixel electrode. Here, the reflective pixel electrode is electrically connected to the active device and disposed in the reflective area, while the transparent pixel electrode is electrically connected to the active device and disposed in the transmissive area. The active device is, for example, disposed below the reflective pixel electrode.

According to an embodiment of the present invention, the active device array substrate further includes a plurality of bumps, and the reflective pixel electrode covers the bumps.

According to an embodiment of the present invention, the active device array substrate further includes a padding layer, and the reflective pixel electrode covers the padding layer and the bumps.

According to an embodiment of the present invention, the opposite substrate includes a padding layer corresponding to each of the reflective pixel electrodes, for example. Moreover, the opposite substrate further includes a common electrode covering the padding layer.

According to an embodiment of the present invention, the opposite substrate includes a color filter substrate.

The present invention further provides an LCD panel. The LCD panel includes an active device array substrate, an opposite substrate and a liquid crystal layer. The active device array substrate includes a plurality of pixel units, and each of the pixel units has a reflective area and a transmissive area. Additionally, the active device array substrate has a plurality of recesses located in a portion of the reflective areas. The opposite substrate is disposed above the active device array substrate and has a plurality of first alignment protrusions corresponding to the reflective area and a plurality of second alignment protrusions corresponding to the transmissive area. The first and the second alignment protrusions are positioned between the opposite substrate and the active device array substrate. In addition, a gap exists between the active device array substrate and a portion of the first alignment protrusions corresponding to the recesses, and the other of the first alignment protrusions contact the active device array substrate. The liquid crystal layer is disposed between the opposite substrate and the active device array substrate.

According to an embodiment of the present invention, the opposite substrate further includes a black matrix corresponding to the first alignment protrusions and the second alignment protrusions.

According to an embodiment of the present invention, each of the pixel units includes an active device, a reflective pixel electrode and a transparent pixel electrode. Here, the reflective pixel electrode is electrically connected to the active device and disposed in the reflective area, while the transparent pixel electrode is electrically connected to the active device and disposed in the transmissive area. The active device is, for example, disposed below the reflective pixel electrode.

According to an embodiment of the present invention, the active device array substrate further includes a plurality of bumps, and the reflective pixel electrode covers the bumps.

According to an embodiment of the present invention, the active device array substrate further includes a padding layer, and the reflective pixel electrode covers the padding layer and the bumps.

On the other hand, the opposite substrate may include a padding layer corresponding to each of the reflective pixel electrodes. Moreover, the opposite substrate further includes a common electrode covering the padding layer.

According to an embodiment of the present invention, the opposite substrate includes a color filter substrate.

In the LCD panels disclosed in the above embodiments of the present invention, the alignment protrusions contacted with the active device array substrate may be used as the spacers, so no additional spacer is required to be disposed in other positions between the active device array substrate and the opposite substrate. Thus it can increase the aperture ratio of the LCD panels.

In order to make the above and other objects, features and advantages of the present invention more comprehensible, several embodiments accompanied with figures are described in detail below.

DESCRIPTION OF EMBODIMENTS

First Embodiment

Figure 1A:
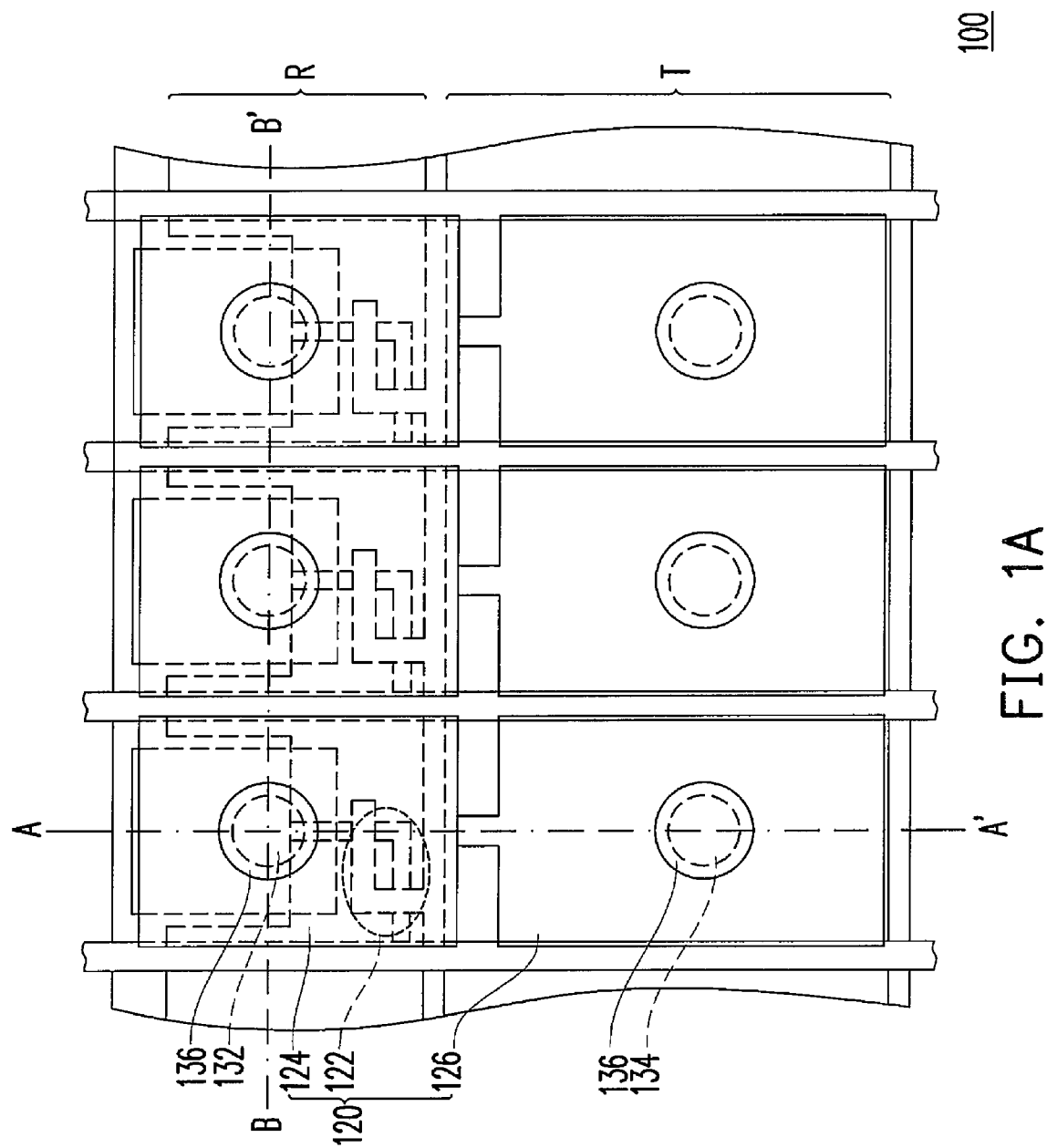
FIG. 1A is a schematic top view of an LCD panel according to a first embodiment of the present invention.
Figure 1B:
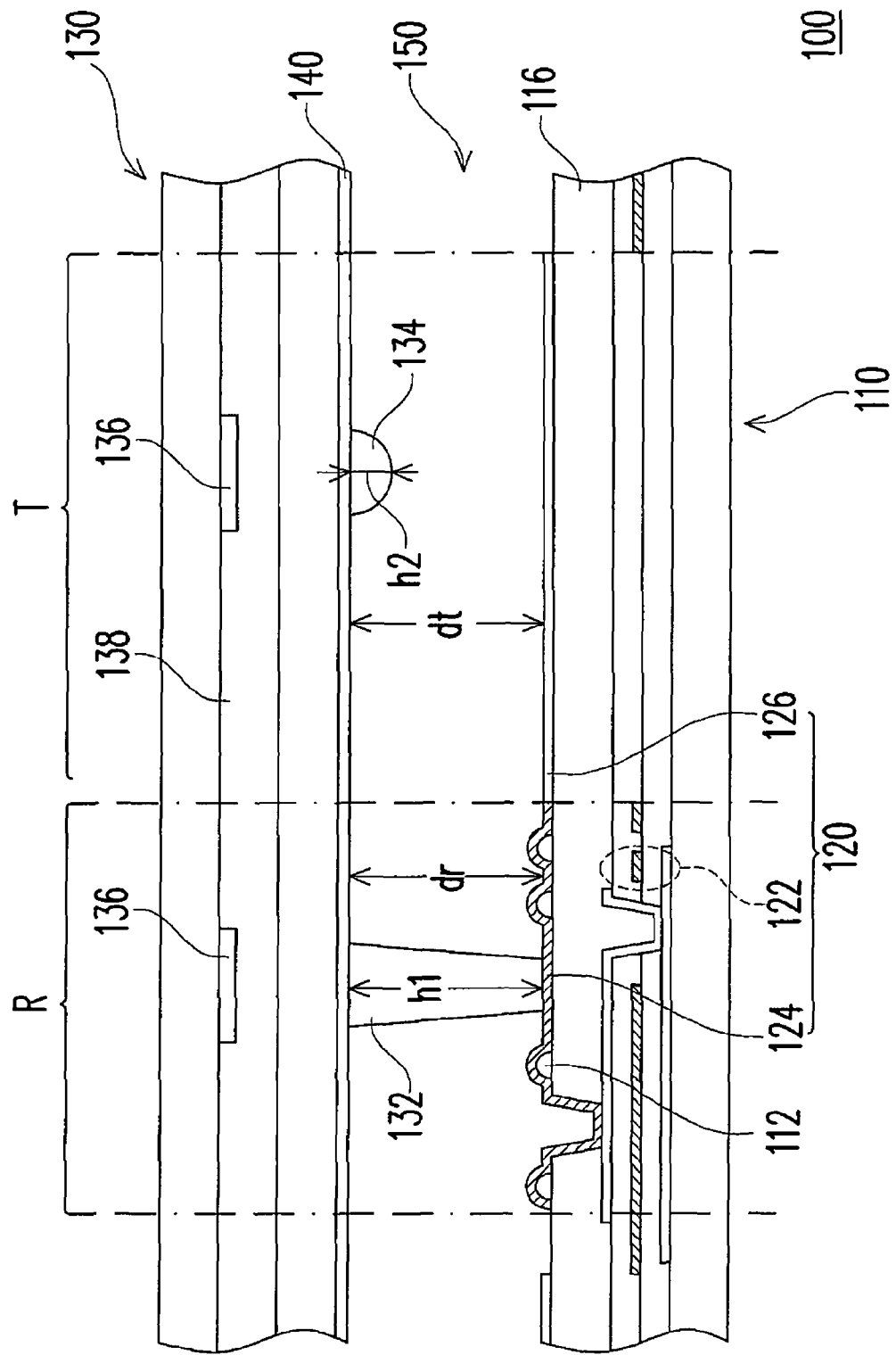
FIG. 1B is a cross-sectional view along a section line AA' in FIG. 1A.
Figure 1C:
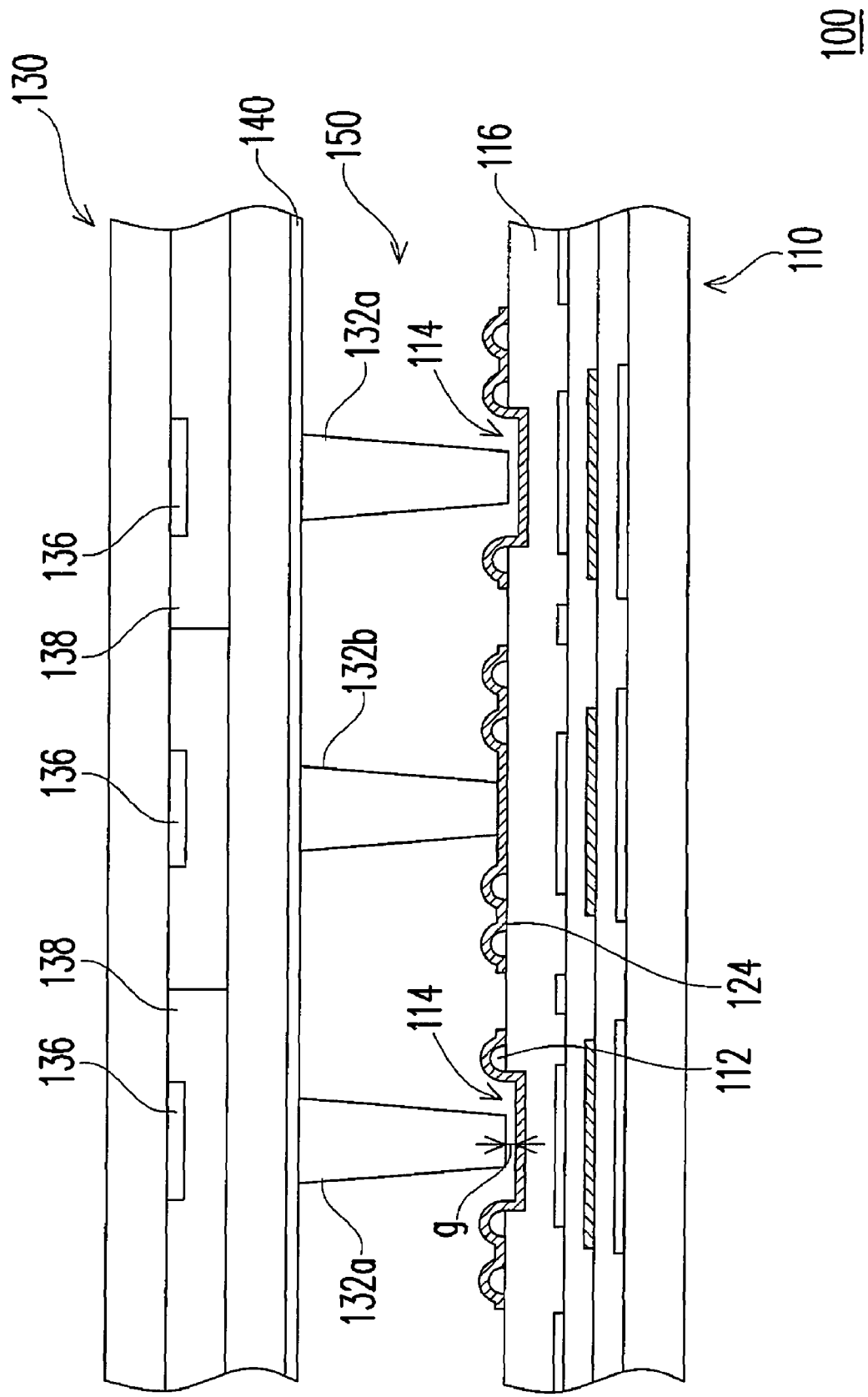
FIG. 1C is a cross-sectional view along a section line BB' in FIG. 1A.

FIG. 1A is a schematic top view of an LCD panel according to a first embodiment of the present invention. FIG. 1B is a cross-sectional view along a section line AA' in FIG. 1A, and FIG. 1C is a cross-sectional view along a section line BB' in FIG. 1A. First, with reference to FIGS. 1A and 1B together, an LCD panel 100 of the present embodiment includes an active device array substrate 110, an opposite substrate 130 and a liquid crystal layer 150. The active device array substrate 110 includes a plurality of pixel units 120, and each of the pixel units 120 has a reflective area R and a transmissive area T. A gap dr of the reflective area R and a gap dt of the transmissive area T are approximately the same, which refers to a single-gap structure. The opposite substrate 130 is disposed above the active device array substrate 110. The opposite substrate 130 has a plurality of first alignment protrusions 132 corresponding to the reflective area R and a plurality of second alignment protrusions 134 corresponding to the transmissive area T. The first alignment protrusions 132 and the second alignment protrusions 134 are positioned between the opposite substrate 130 and the active device array substrate 110. Additionally, a height h1 of the first alignment protrusions 132 is greater than a height h2 of the second alignment protrusions 134. The liquid crystal layer 150 is disposed between the opposite substrate 130 and the active device array substrate 110.

The pixel unit 120 includes an active device 122, a reflective pixel electrode 124 and a transparent pixel electrode 126. Here, the reflective pixel electrode 124 is electrically connected to the active device 122 and disposed in the reflective area R, while the transparent pixel electrode 126 is electrically connected to the active device 122 and disposed in the transmissive area T. In the present embodiment, the active device 122 is, for example, disposed below the reflective pixel electrode 124, while the transparent pixel electrode 126 is electrically connected to the active device 122 through the reflective pixel electrode 124. Therefore, when the LCD panel 100 is driven, the transparent pixel electrode 126 and the reflective pixel electrode 124 have the same voltage. In other embodiments, the transparent pixel electrode 126 and the reflective pixel electrode 124 may be electrically connected to different active devices, respectively, and the transparent pixel electrode 126 and the reflective pixel electrode 124 may have an identical voltage or different voltages.

In order to increase the reflectivity of the reflective pixel electrode 124, a plurality of bumps 112 may be fabricated on the active device array substrate 110 according to the present embodiment, and the reflective pixel electrode 124 covers the bumps 112. Furthermore, the opposite substrate 130 is, for example, a color filter substrate having red, green and blue filter films 138, and a common electrode 140 is further disposed on the opposite substrate 130.

Referring to FIG. 1B, the first alignment protrusions 132 and the second alignment protrusions 134 are, for example, disposed in an active region of the LCD panel 100, which enables liquid crystal molecules in the liquid crystal layer 150 to be arranged in multiple directions. Therefore, the LCD panel 100 achieves a wide-viewing-angle effect. In addition, as shown in FIG. 1B, the first alignment protrusions 132 in the reflective area R may contact the active device array substrate 110. In other words, the height h1 of the first alignment protrusions 132 is sufficient to maintain the gap between the active device array substrate 110 and the opposite substrate 130, such that a thickness of the liquid crystal layer 150 is remained. Thus, the first alignment protrusions 132 may function as spacers, and no additional spacer is required to be disposed in other positions between the active device array substrate and the opposite substrate in the LCD panel 100 for maintaining the thickness of the liquid crystal layer 150.

Light leakage usually occur at edges of the first alignment protrusions 132 and the second alignment protrusions 134. Accordingly, a black matrix 136 may be disposed on the opposite substrate 130 according to the present embodiment. Moreover, the black matrix 136 may be disposed corresponding to the first alignment protrusions 132 and the second alignment protrusions 134. An area of the black matrix 136 appears to approximately exceed an area of the first alignment protrusions 132 and that of the second alignment protrusions 134 when viewing at a vertical angle to the opposite substrate 130, such that the black matrix 136 is capable of shielding the light leakage or other defects, as shown in FIG. 1A. It should be noted that the first alignment protrusions 132 are not only equipped with an alignment function but also functioned as the spacers. Therefore, no additional spacer is required to be disposed in other positions between the active device array substrate and the opposite substrate.

Besides, to maintain the appropriate thickness of the liquid crystal layer 150 (i.e. the cell-gap of the LCD panel), it is necessary to uniformly distribute the spacers at a certain density into the LCD panel 100. Thus, in the present embodiment, the active device array substrate 110 may have a plurality of recesses 114 corresponding to a portion of the first alignment protrusions 132a (as shown in FIG. 1C). In addition, a gap g exists between the active device array substrate 110 and a portion of the first alignment protrusions 132a corresponding to the recesses 114, for example, and the other of the first alignment protrusions 132b contact the active device array substrate 110. The gap g between the portion of the first alignment protrusions 132a and the active device array substrate 110 ranges from 0.1 um to 5.0 um, for example. In brief, a portion of the first alignment protrusions 132b may provide the alignment function and the spacing function, while the other of the first alignment protrusions 132a merely supply the alignment function.

As shown in FIG. 1C, an overcoat layer 116 is, for example, disposed on the active device array substrate 110. In the present embodiment, the recesses 114 are formed on the overcoat layer 116. Particularly, the recesses 114 are, for example, constructed during the process of forming the bumps 112 and removing a portion of the overcoat layer 116, and thus the fabrication of the recesses 114 does not increase or complicate the manufacturing process of the LCD panel 100. It is noted that the recesses 114 may be formed on other films of the active device array substrate 110 in other embodiments. As a whole, the thickness of the liquid crystal layer 150 in the LCD panel 100 may be strictly monitored, such that the LCD panel 100 has a higher aperture ratio.

Second Embodiment

Figure 2A:
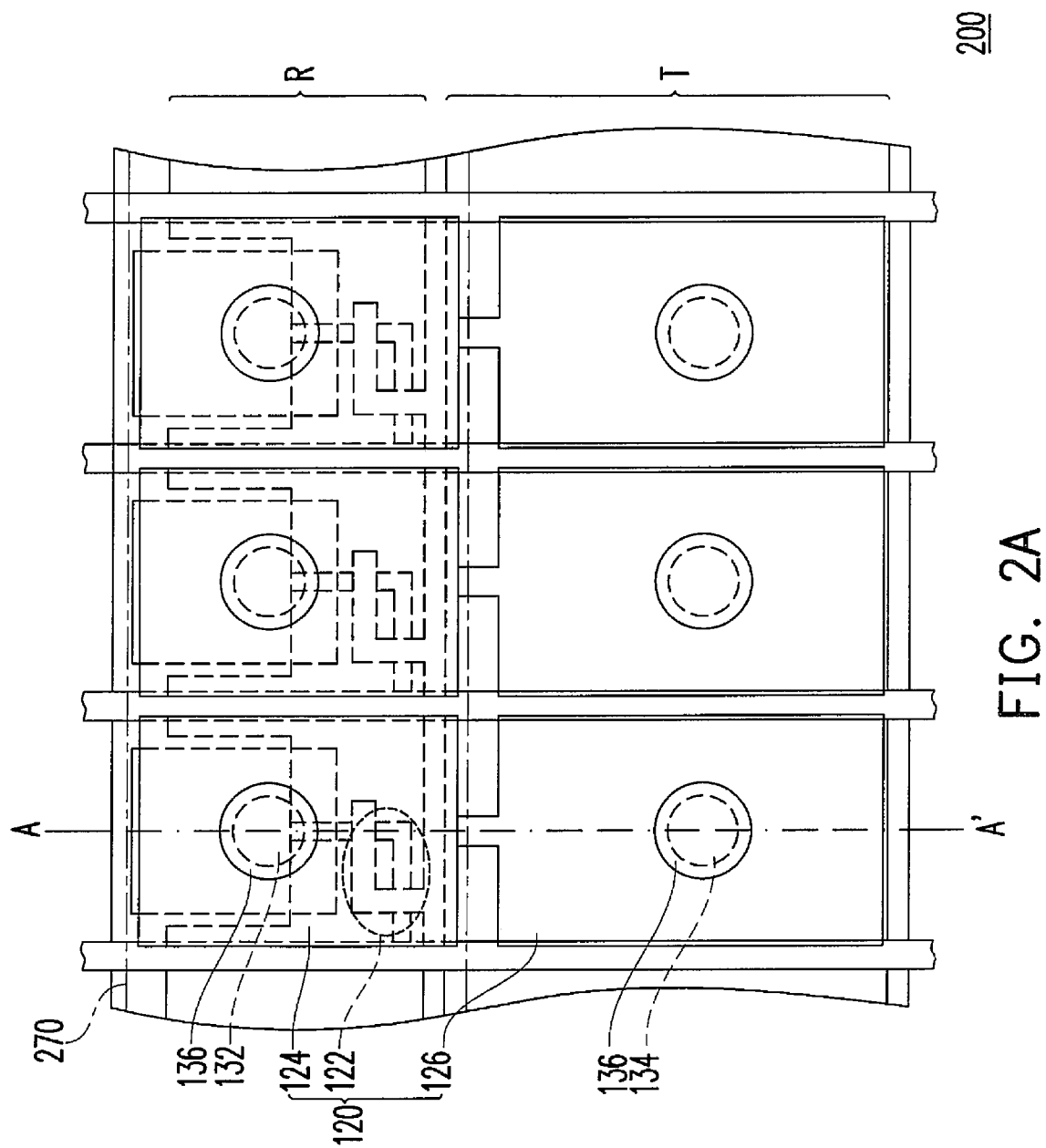
FIG. 2A is a schematic top view of an LCD panel according to a second embodiment of the present invention.
Figure 2B:
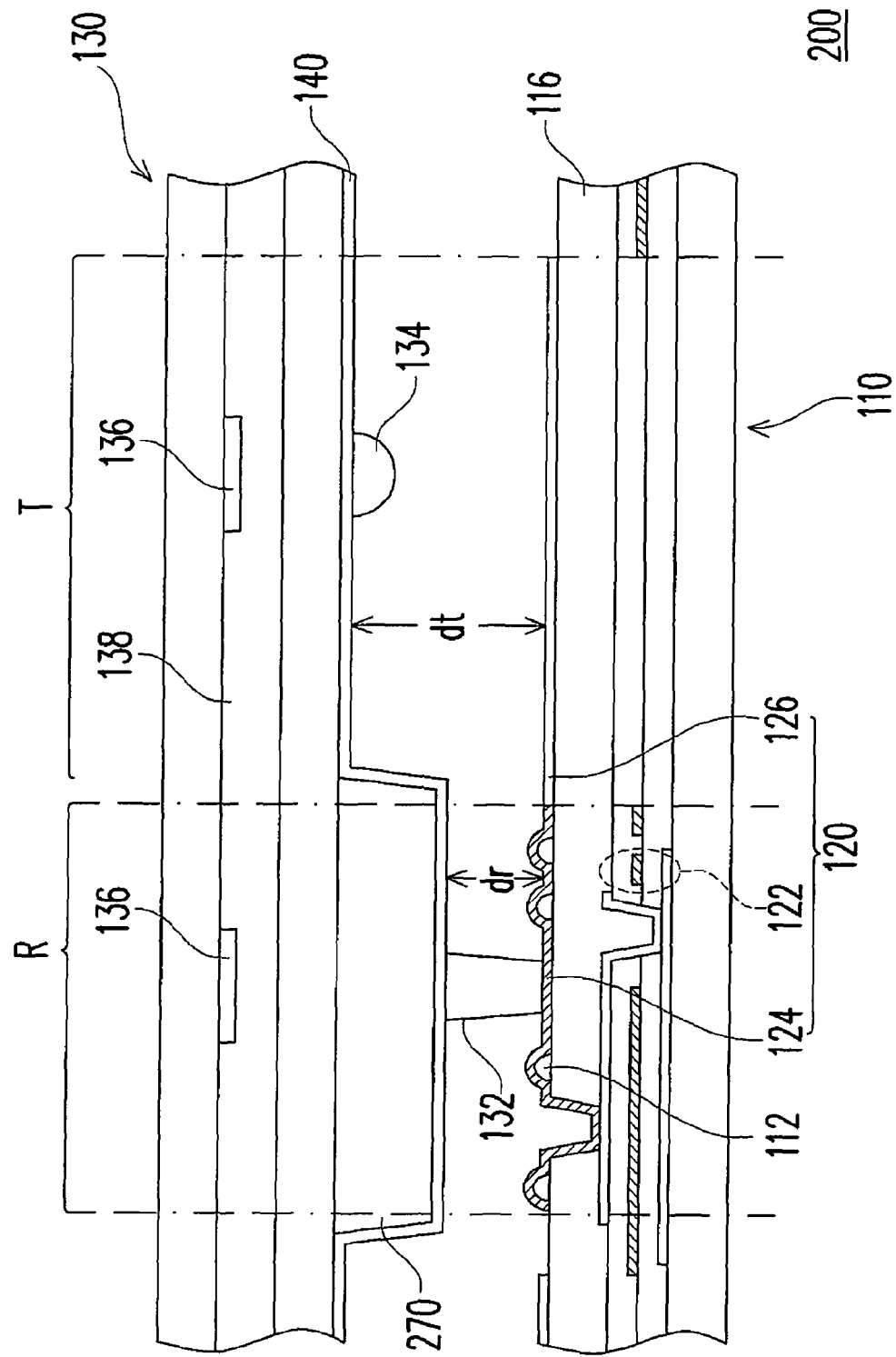
FIGS. 2B and 2C are cross-sectional views along a section line AA' in FIG. 2A.
Figure 2C:
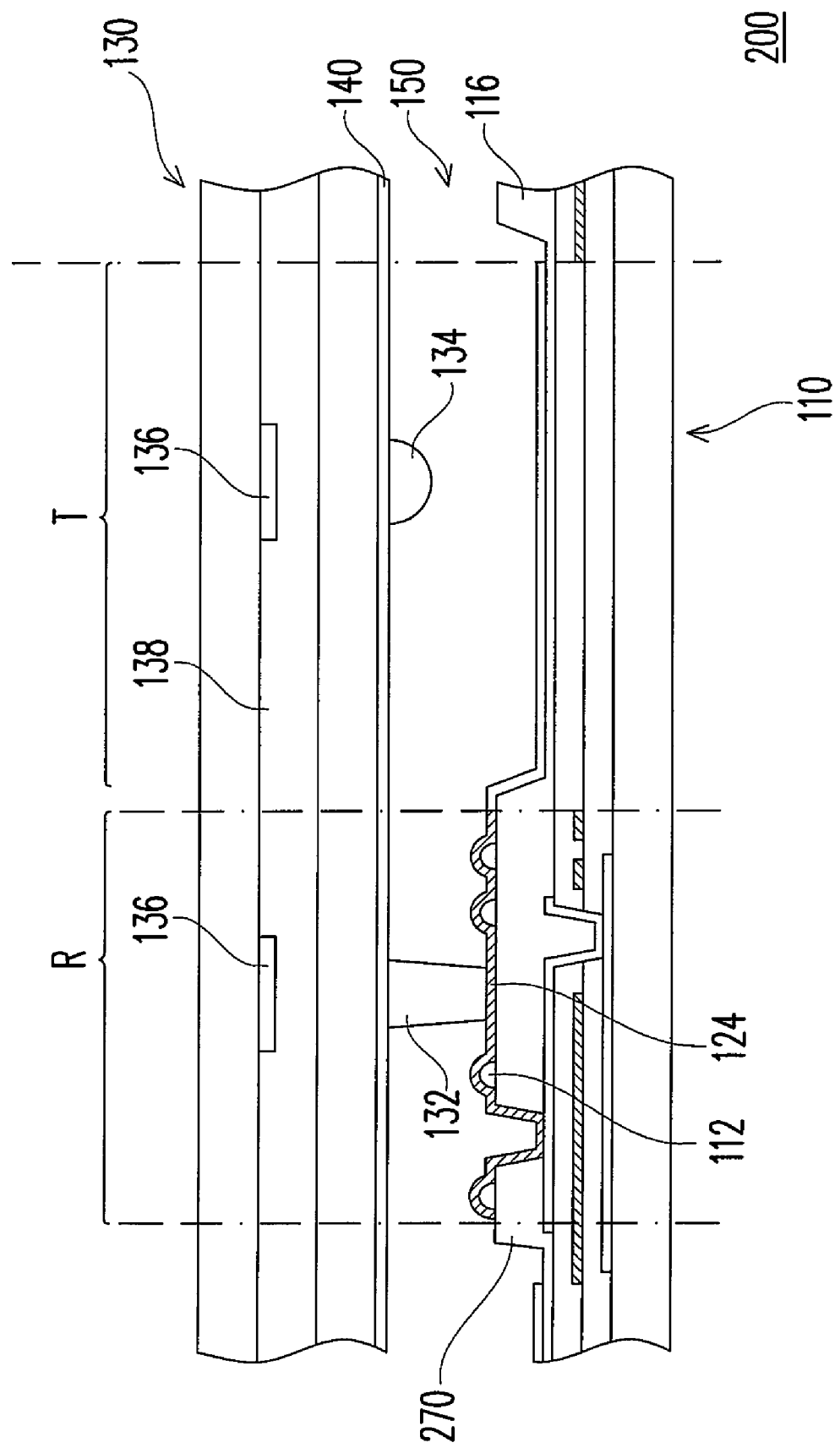

FIG. 2A is a schematic top view of an LCD panel according to a second embodiment of the present invention. FIGS. 2B and 2C are cross-sectional views along a section line AA' in FIG. 2A. Referring to FIG. 2A, an LCD panel 200 of the present embodiment is similar to the LCD panel 100 of the first embodiment. The main difference lies in that a padding layer 270 is disposed in the LCD panel 200. It can be known from FIGS. 2A and 2B that the padding layer 270 is capable of approximately equalizing the product (Δn·d) of the reflectivity of the liquid crystal layer above the reflective area R and the transmissive area T and the thickness thereof, so as to achieve a desired display effect.

According to the present embodiment, the padding layer 270 may be disposed on the opposite substrate 130 (as shown in FIG. 2B) and correspond to each of the reflective pixel electrodes 124. Here, the common electrode 140 on the opposite substrate 130 covers the padding layer 270, and the first alignment protrusions 132 are disposed on the padding layer 270. On the other hand, the padding layer 270 may also be disposed on the active device array substrate 110 (as shown in FIG. 2C). Here, the bumps 112 may be disposed on the padding layer 270, and the reflective pixel electrode 124 covers the bumps 112 and the padding layer 270. The disposition of the padding layer 270 ensures a similar display quality in the reflective area R and in the transparent region T when the LCD panel 200 displays. As the gap dr of the reflective area R is approximately half of the gap dt of the transmissive area T, an optimized optical performance can be accomplished, and said structure is referred to as a dual-gap structure.

Based on the foregoing, the first alignment protrusions 132 and the second alignment protrusions 134 of the LCD panel 200 are the same as those of the LCD panel 100. A portion of the first alignment protrusions 132 may be utilized as spacers, and the height h1 of the first alignment protrusions 132 is greater than the height h2 of the second alignment protrusions 134. Accordingly, the LCD panel 200 also has the advantage of high aperture ratio. It should be noted that the recesses 114 (illustrated in FIG. 1C) disposed corresponding to a portion of the first alignment protrusions 132 may also be formed on the padding layer 270 when the padding layer 270 is positioned on the active device array substrate 110 (as shown in FIG. 2C). Moreover, a distance or the gap between the active device array substrate 110 and the opposite substrate 130 is approximately equal to a total height of the first alignment protrusions 132 and the padding layer 270. With such a design, the LCD panel 200 has not only the high aperture ratio but also a favorable display quality.

Third Embodiment

Figure 3A:
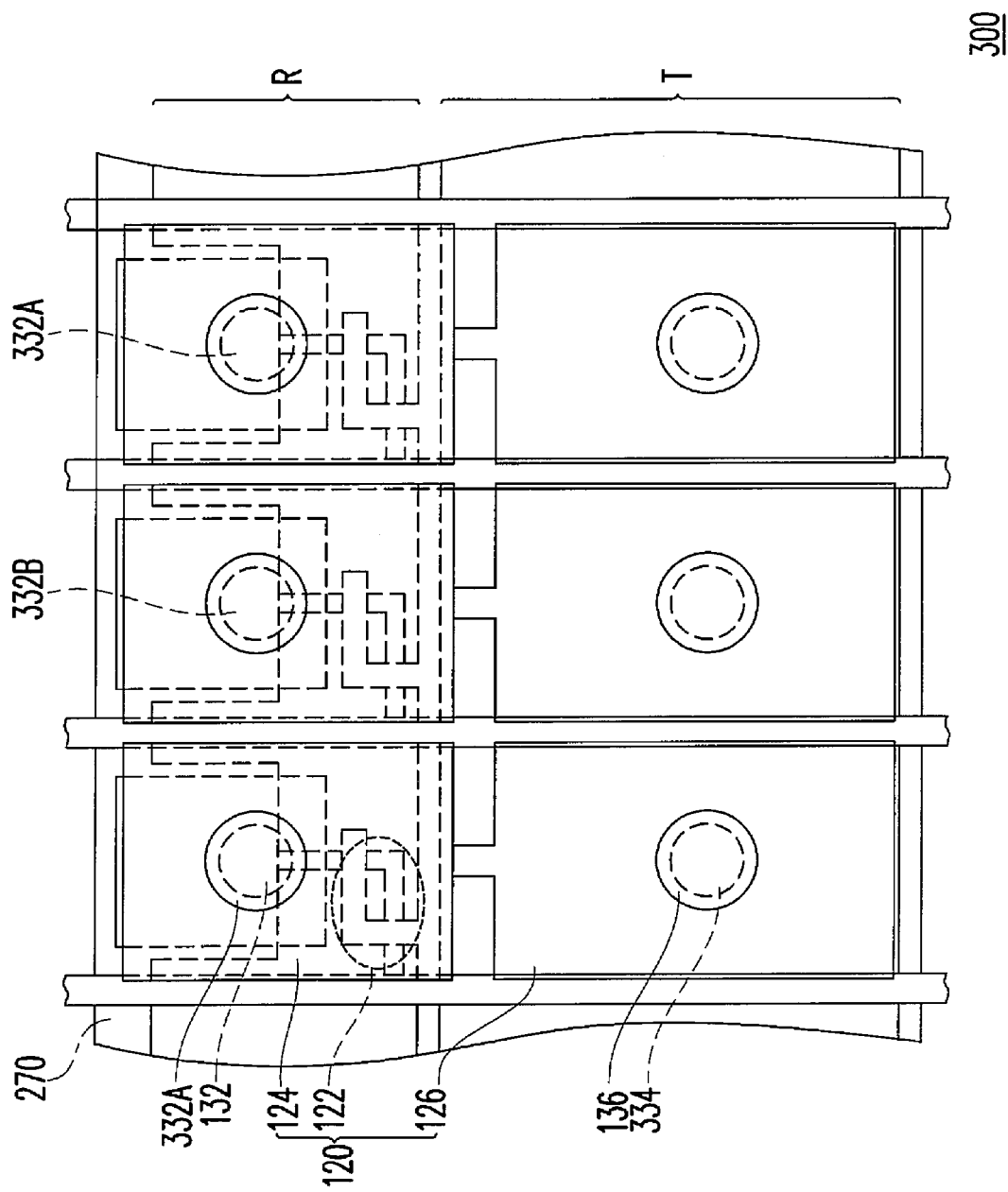
FIG. 3A is a schematic top view of an LCD panel according to a third embodiment of the present invention.
Figure 3B:
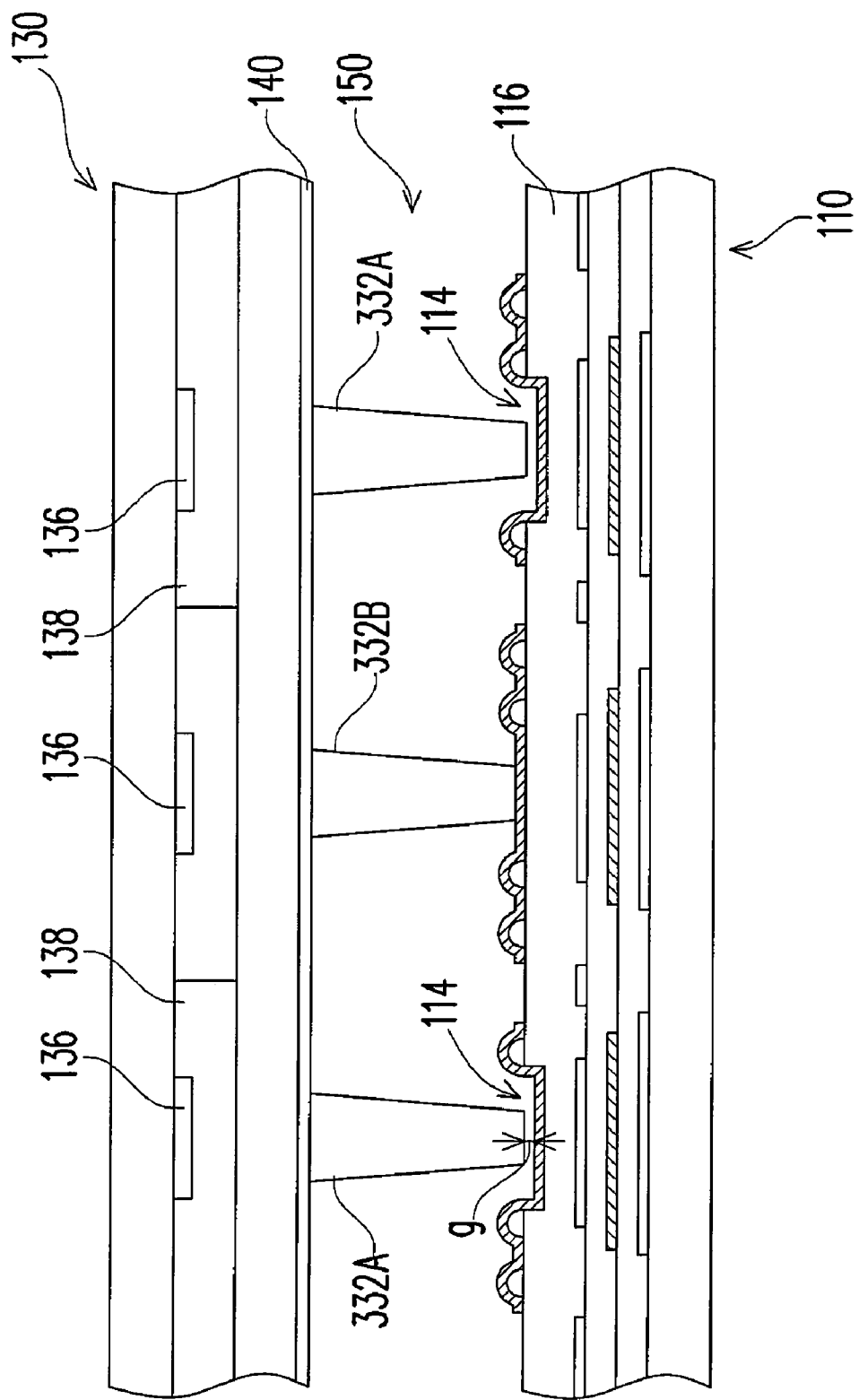
FIG. 3B is a cross-sectional schematic view illustrating a reflective area of the LCD panel according to the third embodiment of the present invention.

FIG. 3A is a schematic top view of an LCD panel according to a third embodiment of the present invention. FIG. 3B is a cross-sectional schematic view illustrating a reflective area of the LCD panel according to the third embodiment of the present invention. An LCD panel 300 of the present embodiment is similar to the LCD panel 100, and the same components depicted therein are labeled with the same reference numbers. Thus, no further description is provided hereinafter.

Referring to FIGS. 3A and 3B, in the LCD panel 300, a plurality of the recesses 114 are formed on the active device array substrate 110, and the recesses 114 correspond to a portion of first alignment protrusions 332A. Here, the gap g exists between the active device array substrate 110 and a portion of the first alignment protrusions 332A, and the other of the first alignment protrusions 332B contact the active device array substrate 110. Practically, a plurality of the recesses 114 on the active device array substrate 110 may be formed in the overcoat layer 116 on the active device array substrate 110 or in other film layers, for example. Additionally, in the LCD panel 300, a height of the first alignment protrusions 332A and 332B is not required to be greater than a height of the second alignment protrusions 334 in the present embodiment.

In the LCD panel 300, a portion of the first alignment protrusions 332B may be used as spacers for maintaining the thickness of the liquid crystal layer 150 to ensure a better quality of the LCD panel 300. Likewise, the LCD panel 300 has a high aperture ratio as the LCD panel 100 of first embodiment does. Furthermore, the LCD panel 300 displays an even better quality as the LCD panel 200 does through the disposition of the padding layer.

Based on the above, in the LCD panel of the present invention, a portion of the alignment protrusions can be used as the spacers, and no additional spacer is required to be disposed in other positions between the active device array substrate and the opposite substrate for maintaining the thickness of the liquid crystal layer, thus it can reduce a loss of the aperture ratio of the LCD panel. In brief, the LCD panel of the present invention has a high aperture ratio.

It will be apparent to those skilled in the art that various modifications and variations can be made to the LCD panel of the present invention without departing from the scope or spirit of the invention. In view of the foregoing, it is intended that the present invention covers modifications and variations of this invention provided that they fall within the scope of the following claims and their equivalents.

What is claimed is:

1. A liquid crystal display (LCD) panel, comprising:
an active device array substrate comprising a plurality of pixel units, each of the pixel units having a reflective area and a transmissive area;
an opposite substrate disposed above the active device array substrate, the opposite substrate having a plurality of first alignment protrusions corresponding to the reflective area and a plurality of second alignment protrusions corresponding to the transmissive area, wherein the first alignment protrusions and the second alignment protrusions are positioned between the opposite substrate and the active device array substrate, a height of the first alignment protrusions is greater than a height of the second alignment protrusions, the first alignment protrusions are disposed within the reflective area, the second alignment protrusions are disposed within the transmissive area, and a portion of the first alignment protrusions contact a reflective pixel electrode of the active device array substrate; and
a liquid crystal layer disposed between the opposite substrate and the active device array substrate.

2. The LCD panel of claim 1, wherein the active device array substrate comprises a plurality of recesses corresponding to a portion of the first alignment protrusions.

3. The LCD panel of claim 2, wherein a gap exists between the active device array substrate and a portion of the first alignment protrusions corresponding to each of the recesses and the other of the first alignment protrusions contact the active device array substrate.

4. The LCD panel of claim 1, wherein the opposite substrate further comprises a black matrix corresponding to the first alignment protrusions and the second alignment protrusions.

5. The LCD panel of claim 1, wherein each of the pixel units comprises:
an active device;
the reflective pixel electrode electrically connected to the active device and disposed in the reflective area; and
a transparent pixel electrode electrically connected to the active device and disposed in the transmissive area.

6. The LCD panel of claim 5, wherein the active device is disposed below the reflective pixel electrode.

7. The LCD panel of claim 5, wherein the active device array substrate further comprises a plurality of bumps, and the reflective pixel electrode covers the bumps.

8. The LCD panel of claim 7, wherein the active device array substrate further comprises a padding layer, the reflective pixel electrode covers the padding layer and the bumps, and the reflective pixel electrodes are disposed between the padding layer and the first alignment protrusions.

9. The LCD panel of claim 5, wherein the opposite substrate further comprises a padding layer corresponding to each of the reflective pixel electrodes, the padding layer is covered by the common electrode, and the first alignment protrusions are disposed between the padding layer and the reflective pixel electrodes.

10. The LCD panel of claim 9, wherein the opposite substrate further comprises a common electrode covering the padding layer.

11. The LCD panel of claim 1, wherein the opposite substrate comprises a color filter substrate.

12. An LCD panel, comprising:
an active device array substrate comprising a plurality of pixel units, wherein each of the pixel units has a reflective area and a transmissive area, and the active device array substrate has a plurality of recesses located in a portion of the reflective areas;
an opposite substrate disposed above the active device array substrate, the opposite substrate having a plurality of first alignment protrusions corresponding to the reflective area and a plurality of second alignment protrusions corresponding to the transmissive area, the first alignment protrusions and the second alignment protrusions being positioned between the opposite substrate and the active device array substrate, wherein the first alignment protrusions are disposed within the reflective area, the second alignment protrusions are disposed within the transmissive area, a gap exists between the active device array substrate and a portion of the first alignment protrusions corresponding to the recesses, and the other of the first alignment protrusions contact a reflective pixel electrode of the active device array substrate; and
a liquid crystal layer disposed between the opposite substrate and the active device array substrate.

13. The LCD panel of claim 12, wherein the opposite substrate further comprises a black matrix corresponding to the first alignment protrusions and the second alignment protrusions.

14. The LCD panel of claim 12, wherein each of the pixel units comprises:
an active device;
the reflective pixel electrode electrically connected to the active device and disposed in the reflective area; and
a transparent pixel electrode electrically connected to the active device and disposed in the transmissive area.

15. The LCD panel of claim 14, wherein the active device is disposed below the reflective pixel electrode.

16. The LCD panel of claim 14, wherein the active device array substrate further comprises a plurality of bumps, and the reflective pixel electrode covers the bumps.

17. The LCD panel of claim 16, wherein the active device array substrate further comprises a padding layer, and the reflective pixel electrode covers the padding layer and the bumps, and the reflective pixel electrodes are disposed between the padding layer and the first alignment protrusions.

18. The LCD panel of claim 14, wherein the opposite substrate further comprises a padding layer corresponding to each of the reflective pixel electrodes, and the first alignment protrusions are disposed between the padding layer and the reflective pixel electrodes.

19. The LCD panel of claim 18, wherein the opposite substrate further comprises a common electrode covering the padding layer.

20. The LCD panel of claim 12, wherein the opposite substrate comprises a color filter substrate.

* * * * *